(12) United States Patent
Tang et al.

(10) Patent No.: US 10,742,359 B2
(45) Date of Patent: Aug. 11, 2020

(54) APPARATUS AND METHOD FOR IMPROVING MESSAGING SYSTEM RELIABILITY

(71) Applicant: DELL PRODUCTS, LP, Round Rock, TX (US)

(72) Inventors: Wenyu Tang, Shanghai (CN); Han Gao, Shanghai (CN); Don Mace, Hopkinton, MA (US); Yongjun Shi, Shanghai (CN); Jim L. Ji, Shanghai (CN); Charlie Chen, Shanghai (CN); Kai Chen, Shanghai (CN)

(73) Assignee: Dell Products, L.P., Round Rock, TX (US)

( * ) Notice: Subject to any disclaimer, the term of this patent is extended or adjusted under 35 U.S.C. 154(b) by 117 days.

(21) Appl. No.: 16/117,274

(22) Filed: Aug. 30, 2018

(65) Prior Publication Data

US 2020/0076539 A1 Mar. 5, 2020

(51) Int. Cl.
*H04L 1/08* (2006.01)
*G06F 16/27* (2019.01)

(52) U.S. Cl.
CPC ............... *H04L 1/08* (2013.01); *G06F 16/27* (2019.01)

(58) Field of Classification Search
CPC ........................................................ H04L 1/08

USPC ................................ 714/748, 746, 751, 749
See application file for complete search history.

(56) References Cited

U.S. PATENT DOCUMENTS

| | | | |
|---|---|---|---|
| 6,529,500 B1 | 3/2003 | Pandharipande | |
| 7,355,988 B1 | 4/2008 | Denbar et al. | |
| 2005/0058081 A1* | 3/2005 | Elliott | G01S 13/825 370/252 |
| 2005/0086384 A1* | 4/2005 | Ernst | H04L 12/00 709/248 |
| 2006/0277285 A1* | 12/2006 | Boyd | H04L 67/14 709/223 |
| 2009/0290522 A1* | 11/2009 | Zhou | H04L 12/185 370/312 |
| 2011/0213820 A1* | 9/2011 | Morris | H04L 69/16 709/201 |
| 2016/0359676 A1* | 12/2016 | Ceccarelli | H04L 41/0677 |

* cited by examiner

*Primary Examiner* — Fritz Alphonse
(74) *Attorney, Agent, or Firm* — Larson Newman, LLP

(57) ABSTRACT

A message system includes a first node that may send a message to a second node, provide metadata associated with the message, and send the metadata to a database. The database may determine that the message was not received by the second node based upon the metadata and a current time, and direct the first node to resend the message to the second node in response to determining that the message was not received. The first node further may resend the message.

20 Claims, 3 Drawing Sheets

APPARATUS AND METHOD FOR IMPROVING MESSAGING SYSTEM RELIABILITY

FIELD OF THE DISCLOSURE

This disclosure generally relates to information handling systems, and more particularly relates to providing a robust messaging system for software systems instantiated on an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A message system includes a first node that may send a message to a second node, provide metadata associated with the message, and send the metadata to a database. The database may determine that the message was not received by the second node based upon the metadata and a current time, and direct the first node to resend the message to the second node in response to determining that the message was not received. The first node further may resend the message.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
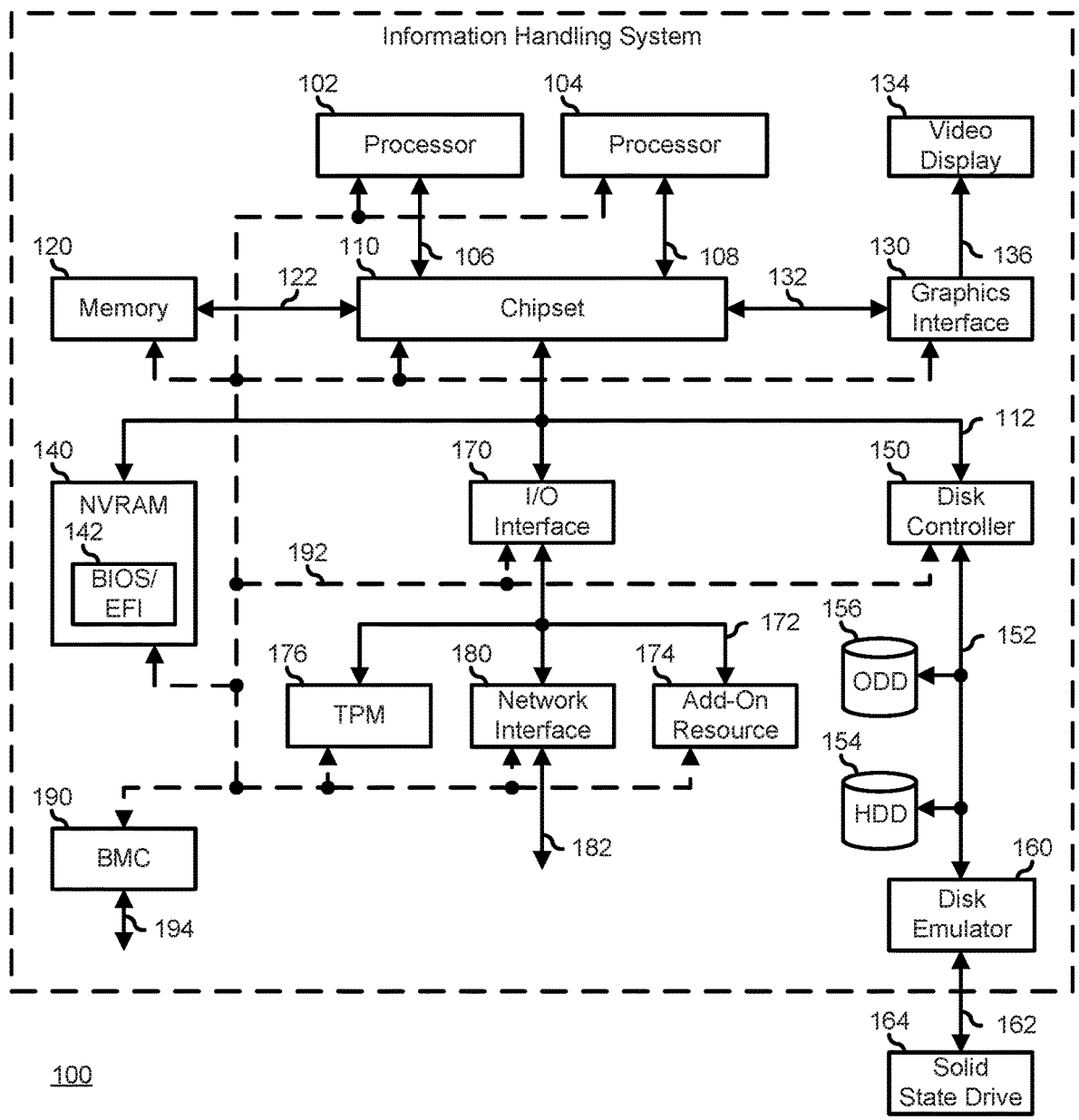
FIG. 1 is a block diagram of an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid state drive (SSD) 164, an input/output (I/O) interface 170 connected to an add-on resource 174 and a trusted platform module (TPM 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like.

Chipset 110 represents an integrated circuit or group of integrated circuits that manages the data flows between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a Peripheral Component Interconnect-Express (PCIe) interface and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. In a particular embodiment, network interface 180 includes a network interface card (NIC) or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a WiFi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term baseboard management controller (BMC) is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 180 can vary considerably based on the type of information handling system. BMC 190 can operate in accordance with an Intelligent Platform Management Interface (IPMI). Examples of BMC 190 include an Integrated Dell Remote Access Controller (iDRAC). Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image. BMC 190 utilizes various protocols and application programming interfaces (APIs) to direct and control the processes for monitoring and maintaining the system firmware. An example of a protocol or API for monitoring and maintaining the system firmware includes a graphical user interface (GUI) GUI associated with BMC 190, an interface defined by the Distributed Management Taskforce (DMTF) (e.g., a Web Services Management (WS-MAN) interface, a Management Component Transport Protocol (MCTP) or, a Redfish interface), various vendor defined interfaces (e.g., a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (e.g., a baseboard, a motherboard, or any combination thereof) of information handling system 100, or is integrated onto another element of the information handling system such as chipset 110, or another suitable element, as needed or desired. As such, BMC 190 can be part of an integrated circuit or a chip set within information handling system 100. An example of BMC 190 includes an integrated Dell remote access controller (iDRAC), or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

In a typical usage case, information handling system 100 provides a messaging system to communicate information between various nodes of a software application. Software applications may be utilized in business systems, manufacturing systems, sales and marketing systems, distribution systems, or other types of systems as needed or desired. A software application may be integrated onto a single information handling system or may be distributed across two or more information handling systems in diverse locations. A messaging system for a software application may utilize a message queue to provide a centralized way to process imbalances in message production and message consumption between the nodes of the software application. A messaging system may employ a message queue mechanism to manage the needs of the software application, to prioritize messages, and to ensure the proper handling of messages in the messaging system. Management of messages in a message system may present challenges when a message is not received by the message queue from the sending node, when a message is not received by the receiving node from the message queue, of when a message fails to be correctly processed by the receiving node.

Figure 2:
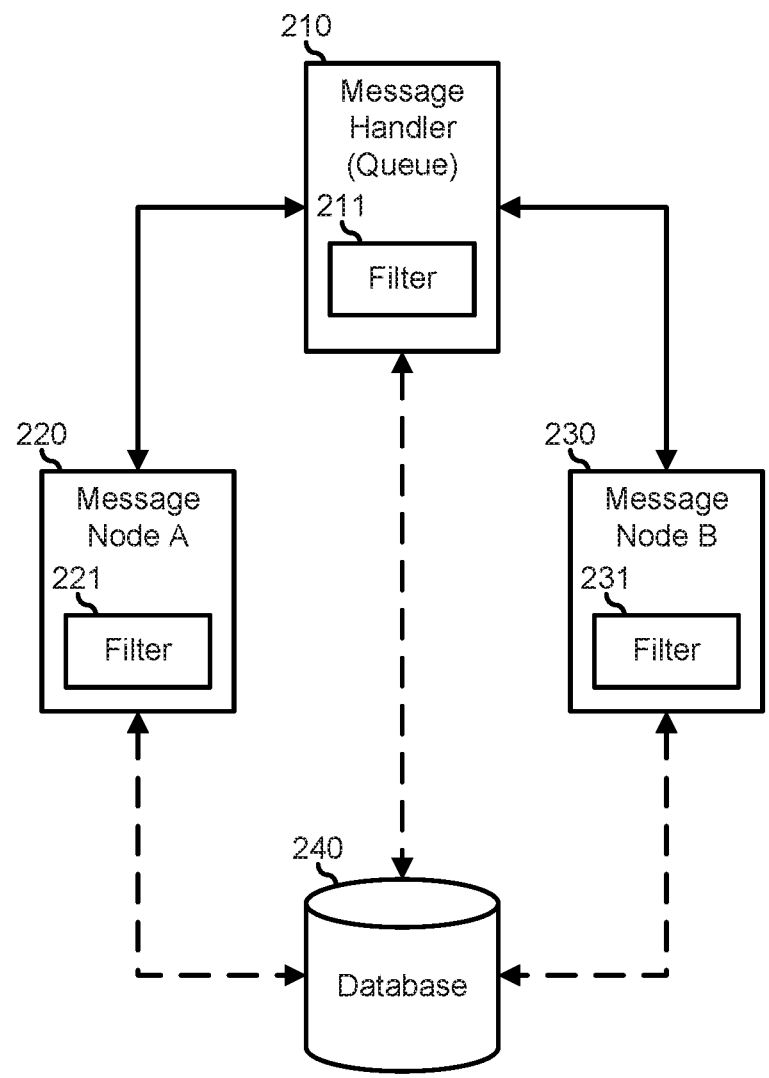
FIG. 2 is a block diagram of a messaging system according to another embodiment of the present disclosure.

FIG. 2 illustrates a message system 200 including a message handler 210, message nodes 220 and 230, and a database 240. Message handler 210, also referred to as message queue 210, represents a centralized node of message system 200 through which all messages of the message system are processed. For example, message queue 210 can implement various individual queue structures, each queue structure being provided to a different priority level of the messages processed by the message queue, such that higher priority messages more advantageously utilize the processing resources of the message queue than lower priority messages. Message nodes 220 and 230 represent nodes of message system 200 that generate and consume messages. For example, message nodes 220 and 230 may represent elements of an order processing system that need to pass various order entry and status information between each other, and that perform various order processes based upon the order entry and status information. Here, each of message nodes 220 and 230 are configured to send to, and receive messages from message queue 210, and to perform the various processes on based upon the messages. It will be understood that message system 200 may include one or more additional message node similar to message nodes 220 and 230. Further, it will be understood that some messages may be broadcast messages that are intended to be received by multiple message nodes. The details of the message processing functions of message system 200 are known in the art and will not be further described herein except as needed to illustrate the teachings of the present disclosure.

Message system 200 operates to uniquely identify each message that is handled by the message system, to track the progress of each message through the message system, to identify when a message has not been received by a mode of the processing system or when a message has not been processed by a receiving node of the processing system, and to direct a sending node to retry, that is, to resent, a message that failed to be received or processed. In particular, when a message is created by one of message nodes 220 or 230, the message is processed through a filter 221 or 231, respectively, to provide metadata associated with the message, and to provide the metadata to database 240. Database 240 receives and stores the metadata as entries in the database that are each associated with a particular message. As the messages work their way through message system 200, the various database entries for each message are updated to indicate a status for the message in its progress through the message system. Database 240 then operates to perform a batch processing job on the entries to determine if any of the messages have failed to be received or to be processed, and to reschedule any failing messages for resending through message system 200.

Message queue 210 and message nodes 220 and 230 each include a respective filter 211, 221, and 231. Filters 221 and 231 operate to intercept new messages generated by respective message nodes 220 and 230, to parse the new messages to create the metadata for the messages, and to send the metadata to database 240. Databased 240 operates to receive the metadata for each message and to create an entry in the database for each message based on the associated metadata. Following are exemplary fields of an entry in database 240:
  ID
  Message_Content
  Max_Time_Period
  Sent_Times Is_Triggered
Last_Trigger_Time
Parameters
Is_Processed
Scheduled_Next_Time.

The ID field includes a unique identifier for a particular message. The Message_Content field includes the contents of the particular message, including headers, footers, body, and other contents of the particular message. The Max_Time_Period, Sent_Times, Is_Triggered, and Last_Trigger_Time fields operate to prevent message loss from the sending node.

The Max_Time_Period field represents a time period within which the associated message should reasonably be expected to be processed by the receiving node if there are no problems encountered in the transmission and processing of the associated message. The time period will be based upon an evaluation of the functions and features of message system 200, and may vary for each different type of message created, the type of processing required by the receiving node, and the like. For example, where the message is from an order processing system to a payment processing system, the expected time to ensure that a message from the order processing system to the payment processing system, and the time needed by the payment processing system to process the payment may be expected to be relatively short, such as 5 minutes, ten minutes, or another short duration, as needed or desired. On the other hand, where the message is from an order processing system to a order fulfillment system, the expected time to ensure that a message from the order processing system to the order fulfillment system, and the time needed by the order fulfillment system to finally ship the order may be expected to be relatively long, such as 1 or two days, or another long duration, as needed or desired. The Sent_Times field represents a number of times the associated message has been directed by database 240 to be resent by the sending node. In a particular embodiment, database 240 implements a maximum limit on the number of times that the database directs a sending node to resend a particular message. Thus, if the contents of the Sent_Times field equals the maximum limit, then, rather than redirecting the sending node to resend the particular message another time, database 240 can operate to provide a remedial action, such as issuing an error indication, issuing the particular message to another node similar to the intended receiving node and that is configured to perform similar functions to the intended receiving node, or to provide other remedial action, as needed or desired. The Is_Triggered field represents a sent state from the sending node indicating that the particular message has been sent and is initially set to "true." The Last_Trigger_Time field holds a timestamp indicating the time at which the particular message was last resent by the sending node.

In operation, new message metadata is sent from one of filters 221 and 231 when a new message is created. The new message metadata includes the unique identifier for the new message in the ID field, and the message content in the Message_Content field. The Max_Time_Period field is set by filter 221 or 231 based upon the type of message and the type of processing required at the receiving node. The Sent_Times field is set to "0," the Is_Triggered field is set to "True," and the Last_Trigger_Time field is loaded with a timestamp indicating the current time. Filters 221 and 231 also operate to add the unique identifier for the particular message to the message itself. When the receiving node receives a message and successfully processes the message, the filter 221 or 231 operates to extract the unique identifier from that message and to direct database 240 to update the Is_Triggered field to "False" for that message. However, if the receiving node fails to properly process a particular message, the receiving node does not provide any update to database 240.

Database 240 operates to periodically perform a batch processing operation on the entries of the database. As a first action, database 240 detects any entries that include the "False" value in the Is_Triggered field, indicating that the receiving nodes both received and properly processed those messages, and the database deletes such entries from the database. Next, database 240 evaluates the remaining entries, that is, the entries that include the "True" value in the Is_Triggerd field, to determine if any of the messages have been pending in message system 200 for longer than their associated Max_Time_Period. If the current time is less than the sum of the timestamp in the Last_Trigger_Time field plus the Max_Time_Period for a particular message, then that message may be deemed to still be in process, and no action is taken by database 240 for that entry until such time as the Is_Triggered field is set to "False," of the maximum time period is exceeded. On the other hand, if the current time is greater than the sum of the timestamp in the Last_Trigger_Time field plus the Max_Time_Period for a particular message, then that message may be deemed to stalled, either in the transmission of that message by message queue 210, or in the processing of that message in the receiving node. Here, database 240 operates to trigger the sending node to resend the particular message and to increment the Sent_Times field for that particular entry. As noted above, if the contents of the Sent_Times field exceeds the maximum limit for a particular message, then database 240 initiates remedial action for that message, rather than triggering the sending node to resend that message again.

In a particular embodiment, message system 200 provides for separate indications as to the progress of a message within the message system based upon whether or not that message is handled by message queue 210, in addition to the receipt and processing by the receiving node. For example, it may be desirable to provide an additional Max_Queued_Period field in the entries of database 240 that is much shorter than the duration of the Max_Time_Period, and which represents a timeframe in which it is expected that the message should be successfully received by message queue. Here, the entries of database 240 can further include a Is_Queued field that is initially set to "False." When message queue 210 receives a particular message, filter 211 operates to extract the unique identifier from that message and to direct database 240 to update the Is_Queued field to "True" for that message. Then, after database 240 detects the entries that include the "False" value in the Is_Triggered field, the database evaluates the remaining entries, to determine if any of the messages entries have Is-Queued fields that are set to "False," and to evaluate those entries to determine if any messages are stalled upon entry to message queue 210. Thus, if the current time is less than the sum of the timestamp in the Last_Trigger_Time field plus the Max_Queuede_Period for a particular message, then that message may be deemed to still be in flight to message queue 210. On the other hand, if the current time is greater than the sum of the timestamp in the Last_Trigger_Time field plus the Max_Queued_Period for a particular message, then that message may be deemed to stalled upon entry to message queue 210, and database 240 operates to trigger the sending node to resend the particular message and to increment the Sent_Times field for that particular entry.

The Parameters, Is_Processed, and Scheduled_Next_Time fields operate to deal intelligently with messages that are processed by the receiving node, but where such processing is not satisfactory to perform the requested process. As such, the Parameters field includes information that encapsulates the particular conditions at a receiving node that may indicate a way in which a particular message was not satisfactorily processed by the receiving node. For example, a particular message may cause an exception in the receiving node or may arrive at an overloaded receiving node, or the requested process may currently be unavailable or overloaded at the receiving node. Here, the Parameters field can include either text information, or coded information that communicates the way in which the particular message was not satisfactorily processed. The Is_Processed field provides an indication that the associated message was processed through the receiving node, and is set with a default value of "False."

When the receiving node processes a particular message satisfactorily, filter 221 or 231 operates to direct database 240 to update the Is_Triggered field to "False" for that message, and the entry for that message is deleted during the next batch processing by database 240, as described above. However, when the processing of a particular message is not satisfactorily performed, filter 221 or 231 operates to direct database 240 to update the Is_Processed field to "True" for that message, while retaining the Is_Triggered field as "True," and provides the database with the Parameters information. Then, during a next batch processing by database 240, when a field is identified as having a Is_Triggered field that is "True," and a Is_Processed field that is "True," then the database operates to calculate a value for the Scheduled_Next_Time field based upon the contents of the Parameters field. For example, the Parameters field can indicate that the receiving node is overloaded, and that the particular message should be retried in 5 minutes. Further, database 240 sets the Is_Triggered field to "False." Then, in subsequent batch processings, when database 240 detects an entry with the Is_Triggered field set to "False" and the Is_Processed field set to "True," then the database compare the current timestamp with the value in the Scheduled_Next_ Time field. If the current timestamp is within the time of the Scheduled_Next_Time, then the database passes the particular entry with no further action. However, when the current timestamp is later than the value in the Scheduled_Next_ Time field, then the database directs the sending node to resend the associated message. Finally, when the sending node resends the particular message, the sending node directs database 240 to update the associated entry by setting the Is_Triggered field to "True," and by loading the Last_Trigger_Time with the timestamp for when the sending node resent the message, and the database increments the Sent_Times field and sets the Is_Processed field to "False."

Figure 3:
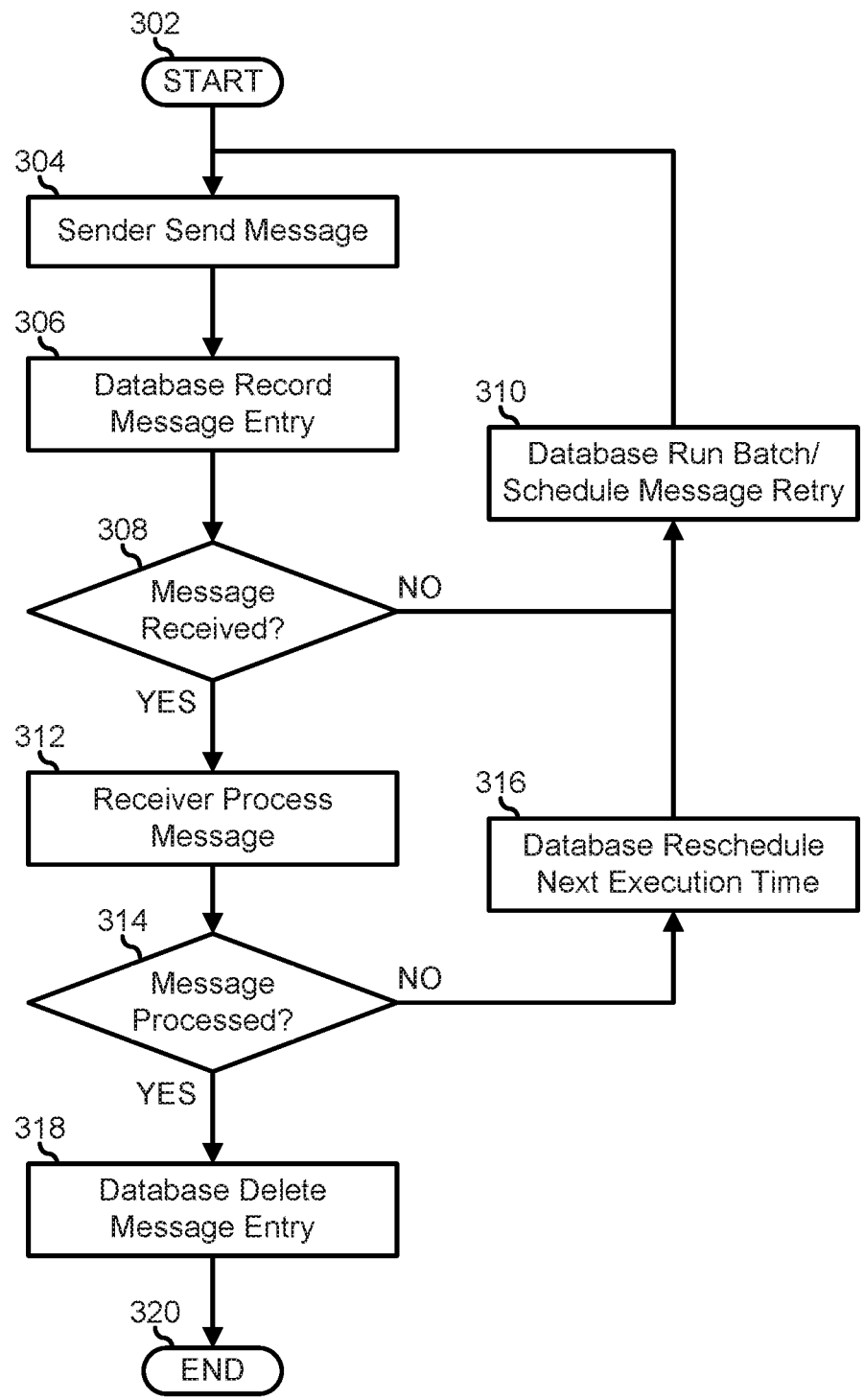
FIG. 3 is a flowchart of a method for providing a robust messaging system for software systems instantiated on an information handling system according to an embodiment of the present disclosure.

FIG. 3 illustrates a method for providing a robust message system for software systems instantiated on an information handling system, starting at block 302. A sending node of the message system sends a message to a receiving node of the message system in block 304. Here, in sending the message, a filter of the sender intercepts the message, creates metadata associated with the message, and sends the metadata to a database of the message system. The metadata may include a unique identifier for the message, a maximum processing time for the message, and a timestamp for when the message was sent.

The database receives the metadata and creates an entry in the database for the message based upon the metadata in block 306. The database makes a determination as to whether or not the message was received by the receiving node after the maximum processing time in decision block 308. Here, the determination is based upon multiple successive runnings of a batch processing job that utilizes the metadata and current time information as described above. If the message was not received by the receiving node after the maximum processing time, the "NO" branch of decision block 308 is taken, the database directs the sending node to retry the message in block 310 and the method returns to block 304 where the sending node resends the message.

When the database determines that the message was received by the receiving node, the "YES" branch of decision block 308 is taken and the receiving node processes the message in block 312. The receiving node updates the database based upon the results of processing the message, and the database makes a determination as to whether or not the message was processed successfully by the receiving node in decision block 312. Again, this determination is based upon further runnings of the batch processing job. If the message was not processed successfully by the receiving node, the "NO" branch of decision block 314 is taken, the database reschedules a time for a next execution of the message in block 316, and the message proceeds to block 310 where, when the rescheduled execution time is reached, the database directs the sending mode to retry the message. If the message was processed successfully by the receiving node, the "YES" branch of decision block 314 is taken, the entry is deleted from the database in block 318, and the method ends in block 320.

For purpose of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A message system for managing messages between nodes of the message system, the message system comprising:
   a database; and
   a first one of the nodes configured to:
      send a message to a second one of the nodes of the message system;
      provide metadata associated with the message; and
      send the metadata to the database;
   wherein the database is configured to:
      determine that the message was not received by the second node based upon the metadata and a current time;
      direct the first node to resend the message to the second node in response to determining that the message was not received
      determine that the message was received by the second node based upon the metadata and the current time and was not processed in accordance with the metadata; and
      direct the first node to resend the message to the second node in response to determining that the message was received and was not processed; and
   wherein the first node is further configured to resend the message in response to the direction from the database.

2. The message system of claim 1, wherein the metadata includes a timestamp that identifies a time when the message was sent to the second node, and a maximum processing time for the message.

3. The message system of claim 2, wherein in determining that the message was not received by the second node the database is further configured to:
   determine that the current time is later than the sum of the timestamp and the maximum processing time.

4. The message system of claim 1, wherein the database is further configured to:
   determine that the message was not processed by the second node based upon the metadata and the current time; and
   direct the first node to resend the message to the second node in response to determining that the message was not processed.

5. The message system of claim 4, wherein the second node is configured to:
   determine that the message was processed; and
   direct the database to update the metadata in response to determining that the message was processed.

6. The message system of claim 5, wherein the database is further configured to determine that the message was processed based upon the updated metadata.

7. The message system of claim 6, wherein the database is further configured to:
   determine that the message was satisfactorily processed by the second node based upon the updated metadata; and
   delete an entry of the database associated with the message in response to determining that the message was satisfactorily processed.

8. The message system of claim 7, wherein the database is further configured to:
   determine that the message was not satisfactorily processed by the second node based upon the updated metadata; and
   set a time for retrying the message in response to determining that the message was not satisfactorily processed.

9. The message system of claim 8, wherein the database is further configured to:
   determine that the time for retrying the message has passed; and
   direct the first node to resend the message to the second node in response to determining that the time for retrying the message has passed.

10. A method for managing messages between nodes of a message system, the method comprising:
    sending, by a first node of the message system, a message to a second node of the message system;
    providing, by the first node, metadata associated with the message;
    sending, by the first node, the metadata to a database;
    determining that the message was not received by the second node based upon the metadata and a current time;
    directing the first node to resend the message to the second node in response to determining that the message was not received;
    determining that the message was received by the second node based upon the metadata and the current time and was not processed in accordance with the metadata;
    directing the first node to resend the message to the second node in response to determining that the message was received and was not processed; and
    resending, by the first node, the message.

11. The method of claim 10, wherein the metadata includes a timestamp that identifies a time when the message was sent to the second node, and a maximum processing time for the message.

12. The method of claim 11, wherein in determining that the message was not received by the second node, the method further comprises:
determining that the current time is later than the sum of the timestamp and the maximum processing time.

13. The method of claim 10, further comprising:
determining that the message was not processed by the second node based upon the metadata and the current time; and
directing the first node to resend the message to the second node in response to determining that the message was not processed.

14. The method of claim 13, further comprising:
determining, by the second node, that the message was processed; and
directing, by the second node, the database to update the metadata in response to determining that the message was processed.

15. The method of claim 14, further comprising:
determining that the message was processed based upon the updated metadata.

16. The method of claim 15, further comprising:
determining that the message was satisfactorily processed by the second node based upon the updated metadata; and
deleting an entry of the database associated with the message in response to determining that the message was satisfactorily processed.

17. The method of claim 16, further comprising:
determining that the message was not satisfactorily processed by the second node based upon the updated metadata; and
setting a time for retrying the message in response to determining that the message was not satisfactorily processed.

18. The method of claim 17, further comprising:
determining that the time for retrying the message has passed; and
directing the first node to resend the message to the second node in response to determining that the time for retrying the message has passed.

19. An information handling system for managing messages, the information handling system comprising:
a memory storing code; and
a processor to execute the code to:
receive metadata from a first node of a message system, the metadata associated with a message sent from the first node to a second node of the message system;
determine that the message was not received by the second node based upon the metadata and a current time;
direct the first node to resend the message to the second node in response to determining that the message was not received;
determine that the message was received by the second node based upon the metadata and the current time and was not processed in accordance with the metadata: and
direct the first node to resend the message to the second node in response to determining that the message was received and was not processed.

20. The information handling system of claim 19, wherein the metadata includes a timestamp that identifies a time when the message was sent to the second node, and a maximum processing time for the message.

* * * * *